United States Patent

[11] 3,613,515

[72] Inventors Kenneth D. Swander, Jr.;
 Charles G. Wearden, both of Prairie Village, Kans.
[21] Appl. No. 859,782
[22] Filed Sept. 22, 1969
[23] Division of Ser. No. 812,538, Mar. 10, 1969, Pat. No. 3,508,470
[45] Patented Oct. 19, 1971
[73] Assignee Certain-Feed Products Corporation Ardmore, Pa.

[54] BRAKE ACTUATOR
 4 Claims, 4 Drawing Figs.
[52] U.S. Cl. .................................... 92/63, 92/130, 188/170, 92/64
[51] Int. Cl. .................................... F01b 21/02
[50] Field of Search .......................... 92/63, 64, 65, 130; 188/170; 60/545

[56] References Cited
 UNITED STATES PATENTS

| | | | | |
|---|---|---|---|---|
| 3,065,997 | 11/1962 | Frankhouser | | 92/64 X |
| 3,112,959 | 12/1963 | Kately | | 92/63 X |
| 3,181,433 | 5/1965 | Cruse | | 92/63 X |
| 3,187,642 | 6/1965 | Cruse | | 92/64 X |
| 3,217,611 | 11/1965 | Leighton | | 92/64 |
| 3,244,079 | 4/1966 | Herrera | | 92/64 X |
| 3,372,623 | 3/1968 | Wearden et al. | | 92/64 X |
| 3,411,417 | 11/1968 | Swander | | 92/63 |
| 3,431,031 | 3/1969 | Ike | | 92/64 X |

Primary Examiner—Martin P. Schwadron
Assistant Examiner—Leslie J. Payne
Attorney—Scofield, Kokjer, Scofield and Lowe ABSTRACT: A vehicle spring emergency and parking brake of the "add-on" or "piggy back" type with the spring chamber outboard (with respect to the wheel, axle or brake, per se) of the service (diaphragm) chamber, said add-on brake having a mechanical release (manual spring back-off) utilizing a bolt stored within the spring chamber itself, one modification having means preventing or warning of attempts to recompress the emergency spring before the bolt is restored to its storage position within the spring chamber and one modification having a portion of the spring chamber retractable within the spring chamber housing itself when the emergency or power spring has been expanded.

Kenneth D. Swander Jr.
Charles G. Wearden
INVENTORS
BY
ATTORNEYS

Kenneth D. Swander Jr.
Charles G. Wearden
INVENTORS

BY

ATTORNEYS

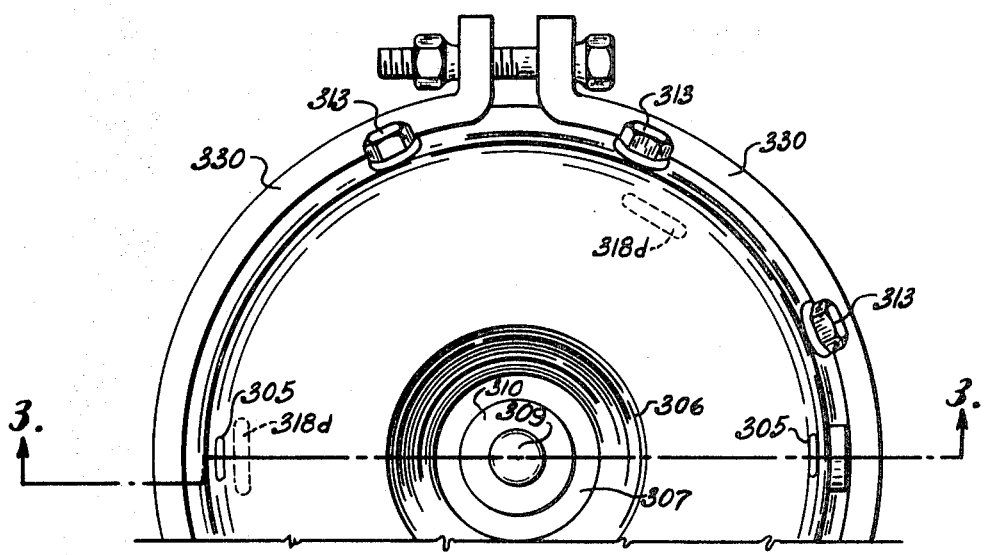
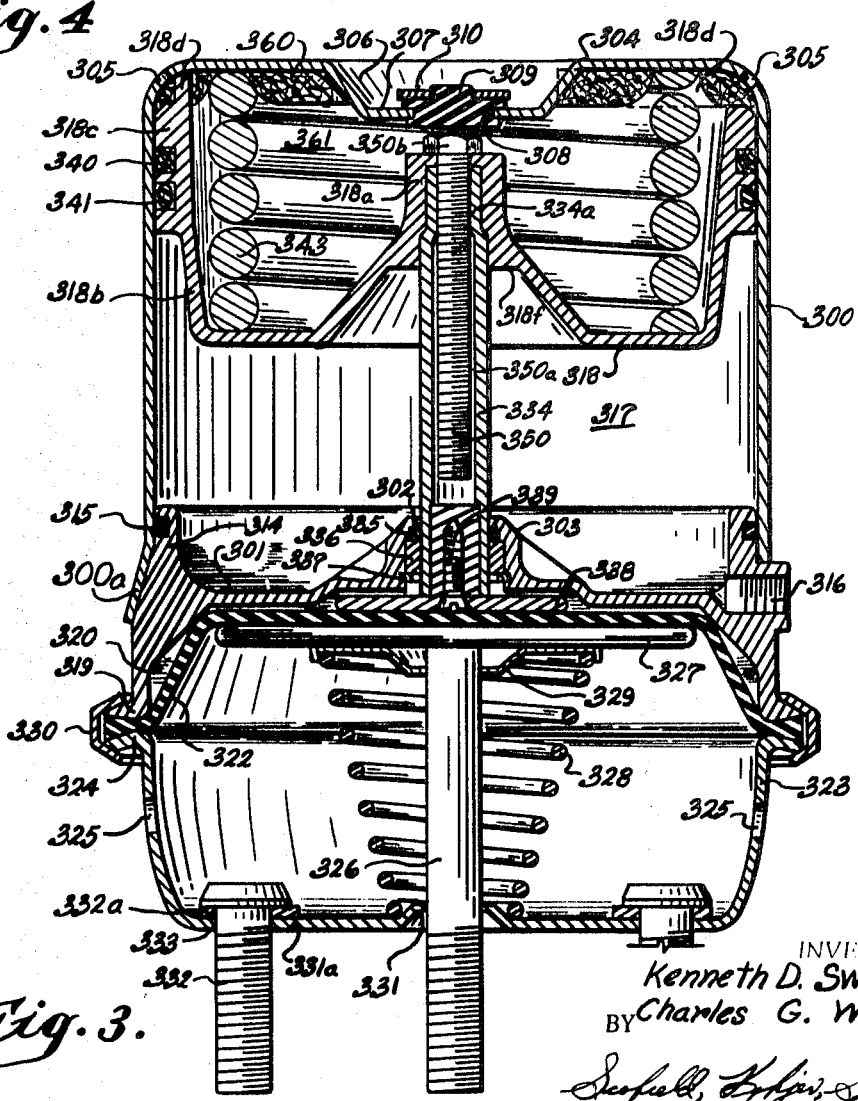
INVENTORS
Kenneth D. Swander Jr.
BY Charles G. Wearden
ATTORNEYS
Fig. 4
Fig. 3

BRAKE ACTUATOR

This application is a division of our application Ser. No. 812,538, filed Mar. 10, 1969 now U.S. Pat. No. 3,508,470 for "Brake Actuator." Ser. No. 812,538 now U.S. Pat No. 3,508,470 was a continuation-in-part of our application Ser. No. 520,693 filed Jan. 14, 1966 for "Brake Actuator," now abandoned.

The general intent of all spring brake actuators is to provide a means of applying the foundation service brakes on one or more axles of a vehicle when same has lost its normal air pressure required to operate the service brake chamber. Under these conditions, it is considered operating as an emergency brake. When the air pressure that is introduced to the spring mechanism air chamber is controlled by the driver and only exhausted after a vehicle is brought to a stop with its service brakes, then it is considered a parking brake.

"Add-On" units are basically spring brake chambers that are attached to a portion of the existing service brake chamber that is already mounted on the vehicle. The "Add-On" type transfers the spring force through a sealed common inner wall, thence to the pressure side of the normal service brake diaphragm, then through the brake application rod and mechanism to the brake shoes, whether it is a cam or a wedge brake mechanism. Many previously designed "Add-On" actuators have had some type of threaded mechanism to permit either the compressing or the relaxing of the power spring for either installing convenience or releasing the spring force that would be applying the brakes and preventing the vehicle from being moved.

The invention basically comprises a device which will apply brakes by spring force when the air pressure in the system drops below a predetermined value. It will also allow this spring force to be released by jack screw action while the air pressure is low. Furthermore, it is so arranged that it will be readily apparent to visual inspection that this spring force has been mechanically released.

An object of the instant invention is to provide an improved "Add-On" emergency and parking brake system particularly incorporating an improved mechanical release for the spring brake.

Another object of the invention is to provide an improved "Add-On" type of emergency and parking brake actuating mechanism which can be economically manufactured, is sturdy in construction, easy to assemble and install and has new and improved features on construction, arrangement and operation.

Another object of the invention is to provide an improved mechanical release construction for a spring emergency brake of the "Add-On" type which is so constructed and arranged as to eliminate the objections and failure hazards heretofore present in similar units.

Another object of the invention is to provide a mechanical release device for an "Add-On" type emergency and parking brake for vehicles wherein the spring emergency brake may be released to a greater or lesser extent as desired by the operator.

Another object of the invention is to provide a mechanical release device for an "Add-On" type spring emergency brake for vehicles wherein, to release the emergency or parking spring, the operator must remove a shield plate from the brake housing, remove a threaded bolt from within the housing, replace the shield plate, put the bolt through the plate and thread into the piston and recompress the spring. Furthermore, to return the brake to regular operation, the above described steps must be fully performed in reverse order.

An object of the invention is to provide an "Add-On" type spring emergency and parking brake wherein, to effect the mechanical release function certain required operations are required to take place in a certain sequence before the mechanical release function can be exercised, a certain effect takes place while the mechanical release function is in effect, and, then, a certain required sequence is necessary to be gone through when the mechanical release feature is to be put into abeyance.

Another object of the invention is to require a mechanical release device associated with an "Add-On" type spring emergency and parking brake wherein the bolt used with the mechanical release is stored within the "Add-On" unit and correct internal storage or replacement of the plate utilized on the outside of the brake unit and full threading of the bolt into the internal brake structure is required.

An object of the instant invention is to provide a mechanical release device, structure and function wherein there is an external plate required to be removed which has a perforation therein, wherein there is engagement of the bolt through the plate into an internally threaded member to effect the mechanical release, wherein there is a sizing of the member in which the bolt is internally stored with respect to stopping of the piston by the housing whereby the bolt must be fully stored before the plate can be rescrewed into the outer housing, and wherein the spring chamber is sealed to air and external contamination when the bolt has been stored within the spring housing for normal use of the brake.

Another object of the invention is to provide a mechanical release device which is used in association with an "Add-On" type spring emergency and parking brake actuator, wherein, where it is desired that the user have the option of mechanically releasing the brake by means which are available and attached to the brake, the bolt and plate which are required to effect the mechanical release are furnished with the unit with the power spring in released position, whereby the dealer may disengage the mechanical release, permitting the power spring to go forward and then throw the bolt and plate away. The opening in the housing may then be sealed with a simple insert. Thereafter, for maintenance, a bolt may be inserted through a slit in the seal or a new plate and bolt furnished.

In the drawings, which form a part of the instant specification and are to be read in conjunction therewith, embodiments of the instant invention are shown and, in the various views, like numerals are employed to indicate like parts.

FIG. 3 is a side sectional view of a modification of the add on spring emergency and parking brake assembly with mechanical release or spring back off means shown stored therein and is taken along lines 3—3 of FIG. 4 in the direction of the arrows.

FIG. 4 is a partial plan view of the device of FIG. 3 looking downward in the view of FIG. 3.

Commercially, an "Add-On" unit may be supplied as a brake actuator either in combination with the service chamber or solely as a spring unit to be added on to a standard service chamber wherein the inner wall of the "Add-On" unit is substituted for the outer wall of the conventional service chamber.

Figure 1:
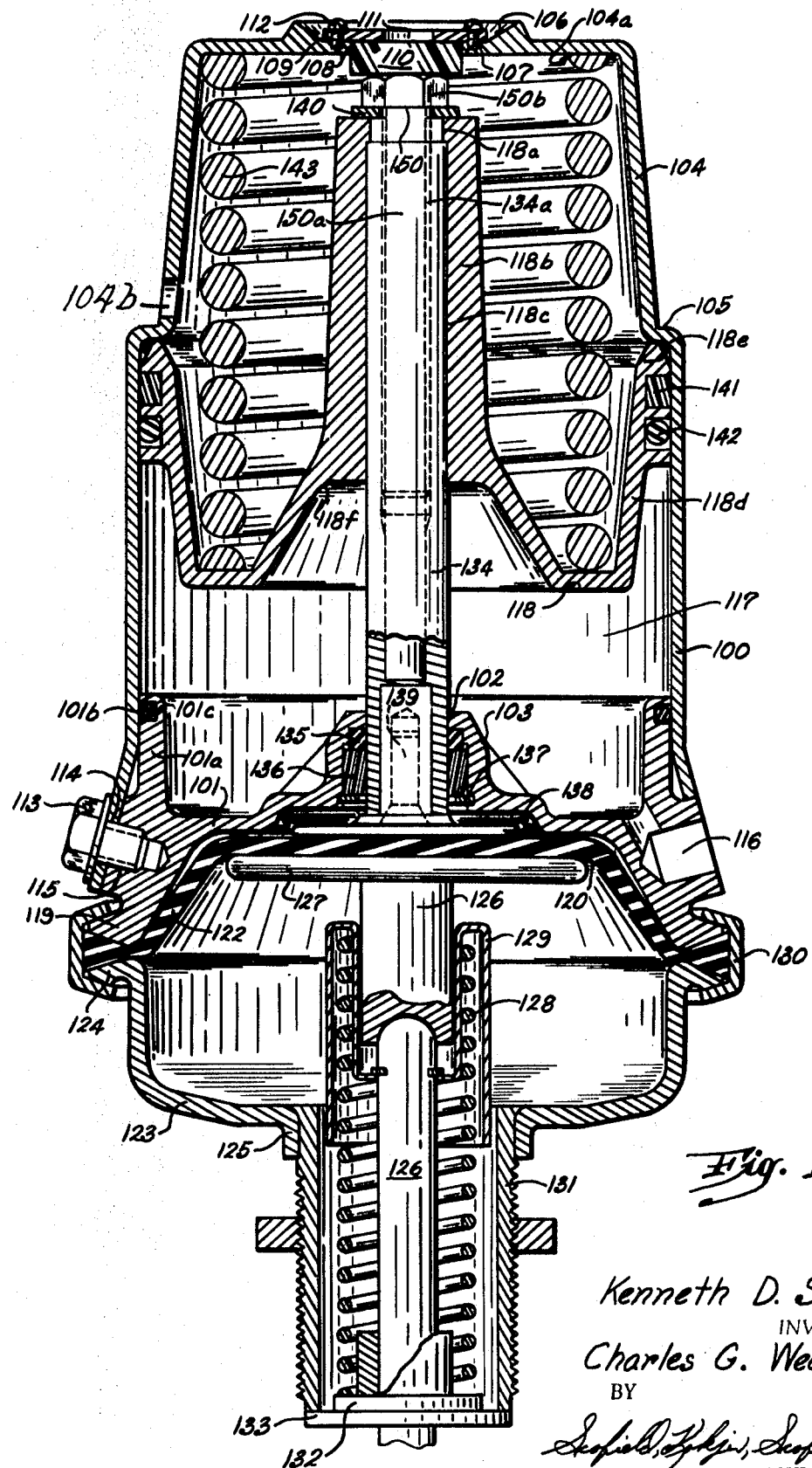
FIG. 1 is a side sectional view of an add on spring emergency and parking brake assembly.

Referring to FIG. 1, at 100 is seen the cylindrical sidewall of a spring brake cylinder. At the inward (toward the vehicle brake assembly) end of the wall 100 is positioned interwall 101 having simple opening 102 therethrough in a slightly outwardly formed portion 103 thereof. At 104 is seen the inwardly indented extension of housing wall 100 which has outwardly peripherally extending flange 105 joining same to wall 100. The sidewall 104 includes a vent opening 104b therein to the interior of the housing. The outer wall portion 104a has a central, inwardly extending recess 106. Recess 106 has central flange 107 at the inward end thereof with an opening 108 therethrough. Cap plate 109 is received within recess 106 having dust and water filter and seal 110 attached thereto and opening 111 therethrough. Suitable internally threaded openings are provided in flange 107 for cap screws 112, the latter removably retaining cap plate 109 in recess 106.

The lower portion of housing 100 (inward portion) connects to interwall 101 by bolts 113 passing through openings 114 into internally threaded holes 115 in interwall 101. Interwall 101 additionally has outwardly extending flange 101a having seal 101b received in groove 101c. An air passage 116 connects with chamber 117 which is between the interwall 101 and the piston generally designated 118.

The interwall 101 has a circumferential flange portion 119 which extends inward and acts as the outer end wall of the pressure half of a service chamber 120, same having pressure inlet passage or opening 121 (not shown). Flange 119 receives conventional flexible diaphragm 122 in engagement thereagainst when the service chamber is assembled. The other half of the service chamber wall is designated 123 and has diaphragm abutting flange 124 and inward terminal flange 125 thereon.

Piston rod 126 and pad 127 connected to the outer end thereof, the latter abutting in conventional manner against the inward side of diaphragm 122. A diaphragm return spring 128 abuts outwardly spring retainer 129. Ring 130 engages flanges 119 and 124 of the service chamber wall portion and the periphery of the diaphragm 122 therebetween. Hollow cylinder 131 encircles piston rod 126. The piston rod 126 slidably passes through the inward spring retainer 132 and also through the opening in plug 133.

Returning to the add-on portion of the brake, which constitutes interwall 101 and that portion of the brake outward therefrom, elongate piston rod or push rod 134 is slidably received within opening 102 with seal means 135 and 136 retained thereagainst by retainer 137. Plate or disc 138 is connected to the inner end of push rod 134 by screw 139 and abuts the side of diaphragm 122 opposite that of pad 127. The outward center portion of piston rod 134 is hollow for part of its length and internally threaded as at 134a whereby to receive the release bolt 150 which includes an externally threaded elongate shaft portion 150a and an enlarged head 150b. Head 150b is of greater outer diameter than the inner diameter of portion 118a of the tubular piston extension 118b into which piston rod 134 is seized or otherwise fixedly attached in central passage 118c. Washer 140 fits between bolt head 150b and the outer end of piston extension 118b. The outer diameter of bolt head 150b is greater than the size of opening 111 in plate 109, but lesser than the outer diameter of opening 108 in flange 107 while washer 140 will pass through opening 108, but not opening 111.

Piston 118 has peripheral outward flange 118d whose outward end 118e abuts against flange 105 in its outermost travel with seal means 141, 142 received in grooves therein. A recess 118f is provided in the center underside of piston 118 to overlie extension 103. Power spring 143 abuts against the outward face of piston 118 and the inner face of outer wall 104a.

Compressed air to the service chamber 120 can enter and exhaust through tapped hole 121 (not shown). Air to the spring compressing chamber 117 enters through opening 116. When a sufficient pressure of air is present in chamber 117, the piston 118 is forced upwardly, as seen in FIG. 1. This compresses spring 143 and also brings disc 138 upwardly in the view close to the interwall 101.

When the spring is compressed, the service brake works in the normal manner, that is, under the influence of air pressure in the service chamber 120 acting on the flexible diaphragm 122. When pressure is increased, diaphragm 122 is forced downwardly in the view of FIG. 1, moving push rod 126 and pad 127 thereby to apply the brake. Under these conditions, with pressure remaining in chamber 117, piston 118 and piston rod 134 remain as shown in FIG. 1. When pressure is reduced in chamber 120, the diaphragm 122 moves upwardly to the view shown in FIG. 1. Push rod 126 moves upwardly along with it, forced by return spring 128. This acts to release the brake.

When air, by whatever reason, is released from chamber 117, the spring 143 forces piston 118 and pressure plate 138 downwardly in the view of FIG. 1, thereby applying the brakes. The brakes can be released only by reinstating the air pressure in chamber 117 or by using the release bolt, as described below.

To use the release bolt 150, plate 109, with filter 110 is removed by taking out the screws 112. The filter is typically a porous material serving to exclude water and dirt. It may be easily detached from the underside of plate 109. Release bolt 150 is then unscrewed from the threaded portion 134a of piston rod 134, using a suitable wrench on its head 150b. The bolt is completely removed from the actuator.

Cover plate 109 is then replaced, together with screws 112 and the release bolt 150 is inserted through the opening 111 in plate 109. Preferably, but not necessarily, washer 140 is replaced between the bolt head 150b and plate 109, penetrated by the shaft of the bolt. Bolt 150 is then rethreaded into the tapped hole 134a. The bolt is then tightened and, acting like a jack screw, pulls piston extension 118b and piston 118 upwardly toward end wall 104a. This compresses spring 143 and releases the brake to the extent the operator threads bolt 150 into the piston extension 118b and piston rod 134.

When the operator wishes to restore normal brake operation, the procedure is reversed. The operator unthreads bolt 150 from piston rod 134, thereby permitting spring 143 to fully return piston 118 to the downward position or the brake applied condition. The release bolt 150 is then completely unthreaded from the rod 134 and removed upwardly through plate 109, plate 109 is removed from the end wall recess 106, and, thereafter, bolt 150 is rethreaded into the hollow center of the push rod 134. Filter 110 is replaced and cover plate 109 is reinstalled and held in place by the four screws 112.

It is dangerous to operate a vehicle with the spring brake mechanically released because there is no emergency brake operation available. With the instant actuator, it is easy to see that the spring brake has been mechanically released, because bolt head 150b will project beyond the washer 140 of plate 109.

Figure 2:
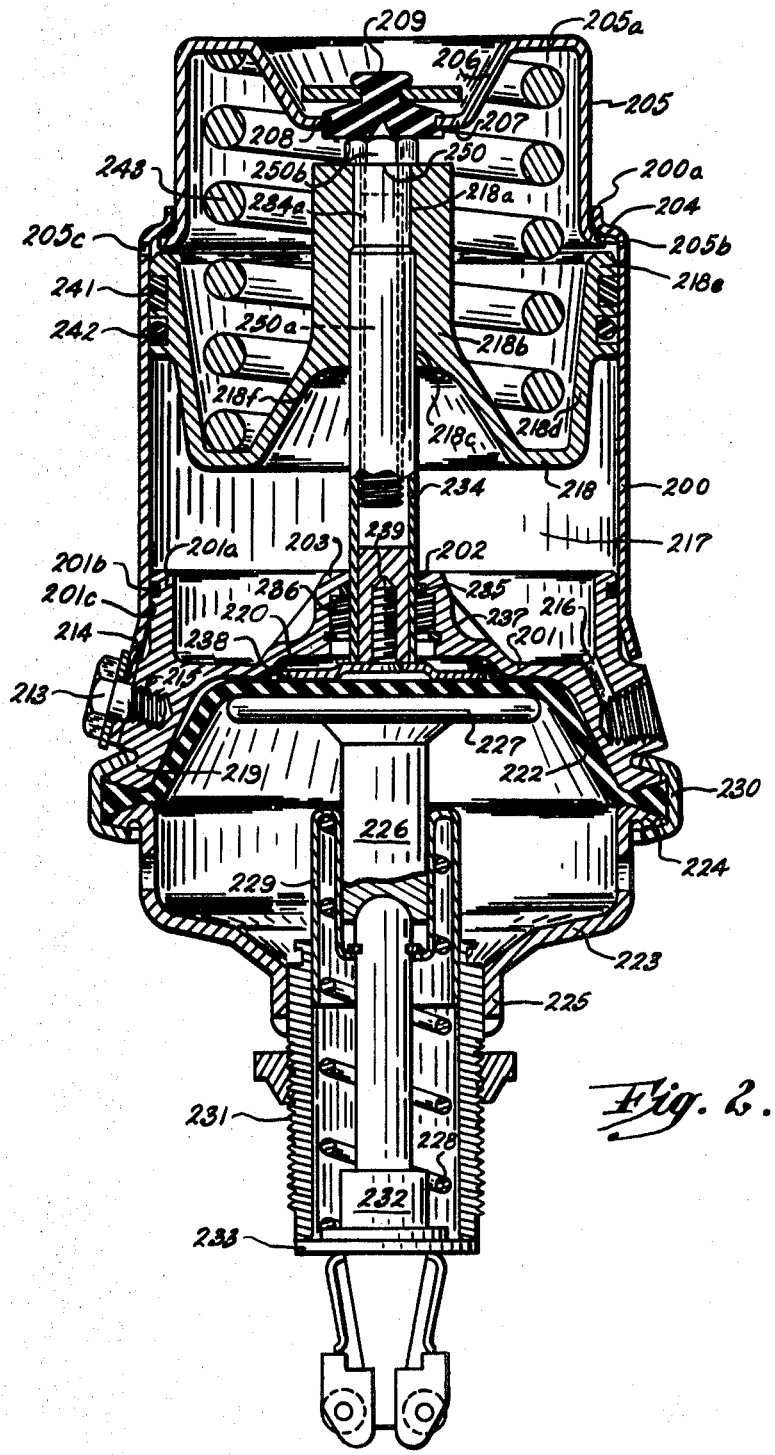
FIG. 2 is a side sectional view of a modification of the instant improvement showing a device analogous to that seen in FIG. 1 but additionally, having the spring chamber divided into parts whereby the spring emergency unit is "condensable" on itself in a telescoping manner.

Referring to FIG. 2, at 200 is seen the cylindrical sidewall of spring brake cylinder. At the inward (toward the vehicle brake assembly) end of wall 200 is positioned inner wall 201 having opening 202 therethrough in a slightly outwardly formed portion 203 thereof. At 204 is seen an inwardly indented peripheral flange 204. The end of sidewall 200 is immediately outward of inwardly indented flange 204 at 200a. The outer end of the spring brake cylinder is provided by cylindrical sidewall 205, of lesser diameter than sidewall 200 whereby to fit within the end 200a thereof. Sidewall 205 has outwardly extending peripheral circumferential flange 205b which, when the end of the spring brake cylinder is extended outwardly from the main body of the spring brake cylinder abuts against inwardly extending flange 204 of sidewall 200. The outer wall portion 205a of cylinder 205 has a central, inwardly extending recess 206. Recess 206 has central flange 207 at the inward end thereof with an opening 208 therethrough. Cap seal 209 is shown positioned in opening 208, but this may be replaced with a perforated seal plate such as plate 109 in FIG. 1 with an underlying seal equivalent to 110 of FIG. 1.

The lower or inward portion of housing 200 connects to inner wall 201 by bolts 213 passing through openings 214 into internally threaded holes 215 in inner wall 201. Inner wall 201 additionally has outwardly extending flange 201a having seal 201b received in groove 201c. An air passage 216 connects with chamber 217 which is between inner wall 201 and the piston, designated generally 218.

Inner wall 201 has a circumferential flange portion 219 which extends inwardly and acts as the outer end wall of the pressure half of a service chamber 220, same having pressure inlet passage or opening 221 (not shown). Flange 219 receives conventional flexible diaphragm 222 in engagement thereagainst. The other half of the service chamber wall is designated 223 and has diaphragm abutting flange 224 and inward terminal flange 225 thereof.

Piston rod 226 has pad 227 connected to the outer end thereof, the latter abutting in conventional manner against the inward side of diaphragm 222. A diaphragm return spring 228 abuts outwardly spring retainer 229. Ring 230 engages removably flanges 219 and 224 of the service chamber wall portion and the periphery of the diaphragm 222 therebetween. Hollow cylinder 231 encircles piston rod 226. Piston rod 226 slidably passes through the inward spring retainer 232 and also through the opening in plug 233.

Returning to the add-on portion of the brake, which constitutes inner wall 201 and that portion of the brake outward therefrom, elongate piston or push rod 234 is slidably received within opening 202 with seal means 235 and 236 retained there against by retainer 237. Plate or disc 238 is connected to the inner end of the push rod 234 by screw 239 and abuts the side of diaphragm 222 opposite that abutted by pad 227. The outward center portion of piston rod 234 is hollow for part of its length and internally threaded as at 234a whereby to receive the release bolt 250 which includes an externally threaded elongate shaft portion 250a and an enlarged head 250b. Head 250b is of greater outer diameter than the inner diameter of portion 218a of the tubular piston extension 218b into which piston rod 234 is seized or otherwise fixedly attached in central lower passage 218c. The outer diameter of bolt 250, and the head portion 250b thereof is lesser than the internal diameter of opening 208 in cylinder end wall 205a, portion 207, whereby a washer (analogous to 140 in FIG. 1), and an outer plate (analogous to plate 109 in FIG. 1) would necessarily be used for the mechanical release function.

Piston 218 has peripheral outward flange 218d whose outward end 218e abuts against flange 205b in its outermost travel with seal means 242 and 241 received in grooves therein. A recessed 218ff is provided in the center underside of piston 218 whereby to overlie extension 203. Power spring 243 abuts against the outward face of piston 218 and the inner face of outer wall 205a.

Compressed air to the service chamber 220 can enter and exhaust through tapped hole 221 (not shown). Air to the spring compressing chamber 217 enters through opening 216. When a sufficient pressure of air is present in chamber 217, the piston 218 is forced upwardly, as seen in FIG. 2. This compresses spring 243 and also brings disc 238 upwardly in the view close to the inner wall 201.

When spring 243 is compressed, the service brake works in the normal manner, that is, under the influence of air pressure in the service chamber 220 acting on flexible diaphragm 222. When pressure in increased, diaphragm 222 is forced downwardly in the view of FIG. 2, moving push rod 226 and pad 227, thereby to apply the brake. Under these conditions, with pressure remaining in chamber 217, piston 218 and piston rod 234 remain as shown in FIG. 2. When pressure is reduced in chamber 220, the diaphragm 222 moves upwardly to the view shown in FIG. 2. Push rod 226 moves upwardly along with it, forced by return spring 228. This acts to release the brake.

When air, by whatever reason, is released from chamber 217, the spring 243 forces piston 218 and pressure plate 238 downwardly in the view of FIG. 2, thereby applying the brakes. The brakes can be released only by reinstating the air pressure in chamber 217 or by using a release bolt.

To utilize the release bolt 250 as seen in FIG. 2, there must be provided a perforated plate (such as plate 109 in FIG. 1) and preferably a washer in the nature of washer 140 as in FIG. 1. When such are present, provided by the operator, the cap 209 can be removed, the bolt 250 unscrewed from hub 218a and removed from the spring chamber. With the bolt outside the housing 205, a plate like 109 in FIG. 1 (not seen) may be laid on flange 207 with a washer (not seen) laid on top of same and bolt 250 passed therethrough to thread into the internally threaded portion 234a of hub piston rod 234. The bolt thus acts as a jack screw and pulls back the piston 218 compressing the power spring 243. When the brake is to be released, the bolt is unscrewed, permitting the piston 218 to move axially in the view of FIG. 2. The bolt is removed from the washer and the plate, the latter two are removed from near opening 208 and the bolt is rethreaded back into the piston rod 234.

It is possible to have the recess 206 of lesser depth than that seen in FIG. 2 whereby the washer (not shown) may be placed under the bolt head 250b without the latter contacting the cap 209 when the piston is in the extreme compressed spring position of FIG. 2 and the bolt is screwed all the way in. Likewise, a plate as plate 109 may be provided and screw holes into flanges 207 in the manner of FIG. 1. The purpose of showing the instant view is to show how a mechanical release bolt may be provided within an add-on type brake without the operator having the option for the mechanical release by having the plate 109 and the washer 140 present. This is sometimes a desirable safety feature and prevents any mechanical release by the operator on the road. Thereafter, when the vehicle is towed into the shop or when a pickup crew arrives for same, the plate 109 and the washer can be provided, the bolt already being present in the unit, but not operable until such aids are present. This also permits mechanical release of the add-on type unit, if desired, only in the shop or coming out of the factory, if such is desired.

When spring 243 has been expanded from the compressed position of FIG. 2, it forces rod 234 and, through diaphragm 222, rod 226 into brake on position. This does not necessarily make the inward portion of piston 218 abut inner wall 201.

When the spring 243 of FIG. 2 has been mechanically released, that is, when the bolt 250 has been unscrewed from hub piston rod 234, and the mechanical release function so performed as described above, the piston 218 is drawn toward the outer wall 205a and ultimately the outward flange 218d of piston 218 approaches inward flange 205b of wall 205. When this is the case, in mechanical release, the position of the piston 218 relative to cylindrical sidewall 205 is exactly that shown in FIG. 2. With bolt 250 holding the piston in this view, in cooperation with a plate 109 and a washer (not seen), it may be seen that a "unit" comprising the piston 218, the compressed power spring 243 and the outer wall unit 205 is provided. This "unit" may be "condensed" or slid into wall 200 whereby the outer wall 205a essentially is in line with outer flange 200a of wall 200 with the innerwall or face of piston 218 approaching inner wall 201.

This telescoping or condensing capacity provides a great condensation of space or volume for storage purposes of these add-on brakes and also for shipment of same.

Likewise, when the unit has been mechanically released, to some extent the spring-wall-piston unit is movable inwardly and outwardly, which is another indication that the mechanical release is in effect and the driver should not proceed with the vehicle.

When the unit has been mechanically released, the add-on brake unit may be disassembled completely as follows. In the first place, assume ring 230 is removed. This permits the removal of lower housing portion 223, rod 226 and pad 227, as well as diaphragm 222. Thereafter, screw 239 permits the removal of disc 238 from rod 234. Following this, the screws 213 are removed whereby inner wall 201 may be taken out of the inward end of wall 200. From this, it may be seen that the entire piston 218—spring 243— wall 205 unit may be pulled out of wall 200 as an operating unit, locked by the mechanical release.

Looking at FIG. 2, the two-piece cylinder construction permits the unit to telescope, when caged, for ease in engaging the push rod to the wedge assembly, before engaging the mounting thread. Further, the piston, spring and spring retainer can be removed from the cylinder as an assembly for maintenance, lubrication and seal replacement.

Referring, then, to FIGS. 3 and 4, at 300 is seen the cylindrical sidewall of a spring brake cylinder. At the inward (toward the vehicle brake assembly) end of wall 300 is positioned an interwall 301 having an opening 302 therethrough in a slightly outwardly formed portion 303 thereof. Sidewall 300, at the outer end thereof, has end wall 304 having vent openings 305 at the curving juncture of sidewall 300 and end wall 304. The outer wall portion 304 has a central, inwardly extending recess 306. Recess 306 has a central flange 307 at the inward end thereof with an opening 308 therethrough. A rubber or plastic plug 309 carrying a cap plate or washer 310 seals opening 308 in flange 307.

The inward portion of sidewall or housing 300 connects to interwall 301 by a plurality of bolts 313 (FIG. 4) passing through openings in the outwardly flanged portion 300a of housing 300 into internally threaded holes (not seen) in the peripheral portion of interwall 301. Interwall 301 additionally has outwardly extending flange 314 having seal 315 received in a circumferential peripheral groove of flange 314. An air passage 316 connects with chamber 317, which is defined as being between the outer face of interwall 301 and the innerface of a piston generally designated 318.

Interwall 301 further has an inward circumferential flange portion 319 which acts as the outer end wall of the pressure half of a service chamber 320, the same having two pressure inlet passages or openings which penetrate the interwall outer periphery at roughly about the same height as passage 316 (but feeding chamber 320), but are not seen in the various views, as they are angularly displaced from passage 316. The same is true of pressure inlet or openings 121 (not shown) in FIG. 1, which is formed through the interwall outer flange at a position angularly disposed from the passage 116. The other half of the service chamber wall is designated 323, flange 319 and wall 323 receiving a conventional, flexible diaphragm 322 therebetween at at the periphery thereof in engagement thereagainst when the service chamber is assembled. The diaphragm abutting flange 324 is provided for on service chamber wall 323, at the outward portion thereof. Vent openings 325 are further provided in wall 323.

Piston rod 326 has pad 327 connected to the outer end thereof, the latter abutting in conventional manner against the inward side of diaphragm 322. A diaphragm return spring 328 abuts outwardly spring retainer 329. An opening 331 is provided through the inward wall 331a of the service chamber. Further, bolts 332 having washers 332a pass through openings 333 whereby to fasten the entire service brake chamber and spring emergency brake to the vehicle.

Returning to the add-on portion of the brake assembly, which constitutes interwall 301 and that portion of the brake outward therefrom, elongate, hollow piston or push rod 334 is slidably received within opening 302 with seal means 335 and 336 retained thereagainst by retainer 337. Plate or disc 338 is connected to the inner end of push rod 334 by screw 339 and abuts the side of diaphragm 322 opposite that of pad 327. The outward center portion of piston rod 334 is hollow for part of its length and internally threaded in the zone 334a whereby to receive the release bolt 350 which includes an externally threaded shaft portion 350a of a bolt having enlarged head 350b. The outer diameter of head 350b must be able to pass through opening 308 in flange 307 of housing outer wall 304.

Piston 318 has peripheral outward flange 318b with seal receiving portion 318c having seals 340 and 341 in circumferential grooves in piston portion 318c. Further, piston portion 318c has mounted on the outward portion thereof, at least end wall abutting lugs or stops 318d. A recess 318f is provided in the central under side of inner side of piston 318 whereby to overlie extension 303. Power spring 343 abuts against the outer face of piston 318 and the inner face of outer wall 304.

Compressed air to the service chamber 320 can enter and exhaust through a tapped hole, previously described, not seen, through interwall outer flange, while air to the spring compression chamber 317 enters through opening 316. When a sufficient pressure of air is present in chamber 317, the piston 318 is forced upwardly, as seen in FIG. 3. This compresses spring 343, and also brings disc 338 upwardly in the view of FIG. 3 close to the interwall 301.

When the spring is compressed, the service brake works in the normal manner, that is, under the influence of air pressure in the service chamber 320 action on the flexible diaphragm 322. When air pressure in chamber 320 is increased, diaphragm 322 is forced downwardly in the view of FIG. 3, moving push rod 326 and pad 327 thereby to apply the brake. Under these conditions, with pressure remaining in chamber 317, piston 318 and piston rod 334 remain as shown in FIG. 3. When pressure is reduced in chamber 320, the diaphragm moves upwardly to the point shown in the view of FIG. 3. Push rod 326 moves upwardly along with it, forced by return spring 328. This acts to release the brake.

When air, by whatever reason, is released from chamber 317, the spring 343 forces piston 318 and pressure plate 338 downwardly in the view of FIG. 3, thereby applying the brakes. The brakes can be released only be reinstating the air pressure in chamber 317 or by using the release bolt, as described below.

The manner of use of the bolt 350 to cage the spring 343 between the outer wall 304 and the piston 318 is precisely the same as previously described with respect to the preceding FIGS. and will not be redescribed in great detail. However, in involves removing plug 309 from opening 308 and the washer 310 therefrom Bolt 350 is then unscrewed from internally threaded portion 334a of the push rod 334. Bolt 350 is then passed through the central opening of plate or washer 310. The externally threaded portion 350a of bolt 350 is then again threaded into the internally threaded portion 334a, with the difference that the washer 310 is between the bolt head 350b and the flange 307. The mechanical release or back-off means may then be applied to compact the spring 343 to the degree desired. To release the piston 318 and spring 343, this process is reversed and the bolt 350 is internally stored within the device. Plug 309 is replaced in opening 308 as seen in FIG. 3, with the washer 310 thereon. The essence of backing off spring 343 with the back-off bolt on FIG. 3 is that release of the ring 330 permits the removal of interwall 301, diaphragm 322 and the outward attachments to interwall 301. Thereafter, unscrewing screw 339, to remove plate 338, interwall 301 may be removed for access to the seals 335 and 336 or the interior of chamber 317.

There is additionally supplied a filter insert 360 running from the peripheral inside wall of indentation 306 out to the interface of the top or outward portion of cylindrical sidewall 300 whereby to cover the openings 305. The lugs 318d punch into this material in their stop abutment against the end wall 304, but do not destroy the air seals at the vents 305. Thus, air which is drawn into and exhausted from the spring chamber 361 passes through a filter of porous resilient material as at 360, such as urethane foam.

In FIGS. 1 and 3, the housing for the spring emergency portion of the brake (or the add-on portion of the brake) in both cases is unitary from its connection to the interwall (which defines the outer wall of the service chamber) and the center perforation in the end wall of the said emergency portion of the housing. The add-on brake units in the prior art typically show either an end cap with a snap ring holding same in a cylindrical emergency housing wall or a slip housing. Other prior art shows the emergency housing threaded onto an extension of the interwall as well as an outer stop for a flat piston comprising a central plug. The latter is bad because it tends to bow out the end of the spring housing in the center. A flat piston tends to bind and cant under high air pressures.

Our housing improvement in FIGS. 1 and 3 is to provide concentrically and centering effects of the outwardly tapered housing skirt on the tapered bulkhead plug. We employ a plurality of cap screws to tie down the skirt on the plug. When removed (follower foot 338 or 138) and the spring caged, the entire housing can be lifted off as a unit. Further, we employ peripheral bearing of the piston with no hazard of punching out the center of the end housing.

FIG. 1 has a double tapered can giving a stop on a shorter length peripheral piston wall.

Vent 205c is placed in a position in FIG. 2 which is freed by the internal end 205b of the outboard condensable portion 205 of the housing from coverage by the end 218d of the piston.

In FIGS. 1 and 3, by virtue of the unitary housing and peripheral bearing of the piston, we do not employ a joint between the spring retainer (outer housing of spring chamber)

and the inner part of the spring chamber. There is always an explosion potential if the snap ring or band is knocked off. Such joint is generally in the vicinity of the wheel area, as opposed to an inward connection to the outer portion of the service chamber as in FIGS. 1 and 3. Bands per se (snap rings) or screw anchored bands or snap rings tend to corrode and deteriorate, also. Further, in our structure, there is no loss of spring if we lose one or more cap screws 113 or 313. We might lose pressure in the spring compression air chamber 117 or 317, but this would just permit the spring application of the brake. On the other hand, loss of the snap ring would cause a spring explosion. All cap screws must be removed to take out the spring unit in FIGS. 1 and 3.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from all scope thereof, it is to be understood that all matter herein set forth or shown in the accompanying drawings in to be interpreted as illustrative and not in a limiting sense.

Having thus described our invention, we claim:

1. In combination,
a cylinder,
said cylinder having inner and outer ends with respect to a vehicle brake mechanism,
the inner end of said cylinder connectable by removable screw or bolt means to an inner wall member having a central opening therethrough,
said inner end of said cylinder being circumferentially outwardly tapered to form a flared skirt portion and the peripheral portion of the inner wall member being tapered inwardly toward said cylinder,
whereby the flared skirt portion of said cylinder and the tapered peripheral portion of said inner wall member fit in sliding engagement prior to connection by said screw or bolt means,
said screw of bolt means connecting the outwardly tapered cylinder inner end and the inwardly tapered inner wall member through both of said tapered portions,
an O-ring received on the inner wall member continuously and circumferentially sealing said cylinder and inner wall member,
the outer end of said cylinder having an outer wall member whereby to provide a housing construction,
a movable wall slidably fitting said cylinder with the outer face thereof facing the outer wall member of said cylinder,
said cylinder vented outwardly from the outer face of said movable wall to permit movement of said movable wall,
a movable wall rod connected at one end centrally of said movable wall, extending inwardly therefrom and having a sliding fit through a inner wall member central wall opening, and
coil compression spring means seating between the outer face of said movable wall and the outer wall member of said cylinder.

2. A device as in claim 1 including stop means on one of the cylinder and movable wall to limit the travel of said movable wall toward the outer wall member of said cylinder, said stop means to limit the travel of said movable wall toward the outer wall member of said cylinder comprises a circumferential step in said cylinder intermediate the ends thereof, the outer portion of said cylinder of reduced diameter with respect to the inner portion of said cylinder.

3. A device as in claim 1 wherein the connection between the outer end of said cylinder and the outer wall member is circumferentially curved in section,
stop means on one of the cylinder and movable wall to limit the travel of said movable wall toward the outer wall member of said cylinder,
said stop means to limit the travel of said movable wall toward the outer wall member of said cylinder comprises a plurality of extensions of the peripheral portion of said movable wall which operate to strike the outer wall member when said coil compression spring means has been compressed,
said extensions so positioned as to contact the outer wall member radially inwardly of the said curved connection of same to the cylinder.

4. In combination,
a closed housing having inner and outer end walls with respect to a vehicle brake mechanism, said inner and outer end walls having central openings therethrough,
a flexible diaphragm within said housing and peripherally secured thereto,
said diaphragm having an outer side facing the outer end wall of said housing and an inner side facing the inner end wall of said housing,
means for introducing fluid under pressure to said housing between the outer end wall thereof and the outer side of said diaphragm,
a brake operating rod on the inner side of said diaphragm axially arranged relative thereto,
said rod projecting through the central opening of the inner end wall of said housing for reciprocatory movements,
a disclike pad on the outer end of said brake rod operable to bear against the inner side of said diaphragm,
a cylinder open at its inward end at the outer end wall of said housing,
said cylinder having inner and outer ends with respect to said vehicle brake mechanism,
the outer end wall of said housing constituting the inner wall member of said cylinder,
the inner end of said cylinder connectable to the outer end wall of said housing by removable screw or bolt means,
said inner end of said cylinder being circumferentially outwardly tapered to form a flared skirt portion and the peripheral portion of the outer end wall of said housing being tapered inwardly toward said cylinder,
whereby the flared skirt portion of said cylinder and the peripheral portion of the outer end wall of said housing fit in sliding engagement prior to connection by said screw or bolt means,
said screw or bolt means connecting the outwardly tapered cylinder inner end and the inwardly tapered inner wall member through both of said tapered portions,
an O-ring circumferentially received on the inner wall member continuously and circumferentially sealing said cylinder and inner wall member,
the outer end of said cylinder having an outer wall member whereby to provide a housing construction,
a movable wall slidably fitting said cylinder with the outer face thereof facing the outer wall member of said cylinder,
said cylinder vented outwardly from the outer face of said movable wall to permit movement of said movable wall,
stop means on one of the cylinder and movable wall to limit the travel of said movable wall toward the outer wall member of said cylinder,
a movable wall rod connected at one end centrally of said movable wall, extending inwardly therefrom and having a sliding fit through said central opening in the outer end wall of said housing,
a disc member on the inner end of said movable wall rod operable to bear against the outer side of said diaphragm, and
coil compression spring means seating between the outer face of said wall of said movable wall the the outer wall member of said cylinder.